May 30, 1972 P. A. H. PANKOW ET AL 3,666,361
CODE STRUCTURE ON FILM CARTRIDGES
Filed Feb. 2, 1970 2 Sheets-Sheet 1

INVENTORS
PAUL A. H. PANKOW
R. ALAN DeVRIES
BY Kinney, Alexander,
Sell, Steldt & DeLaHunt
ATTORNEYS May 30, 1972 P. A. H. PANKOW ET AL 3,666,361
CODE STRUCTURE ON FILM CARTRIDGES
Filed Feb. 2, 1970 2 Sheets-Sheet 2
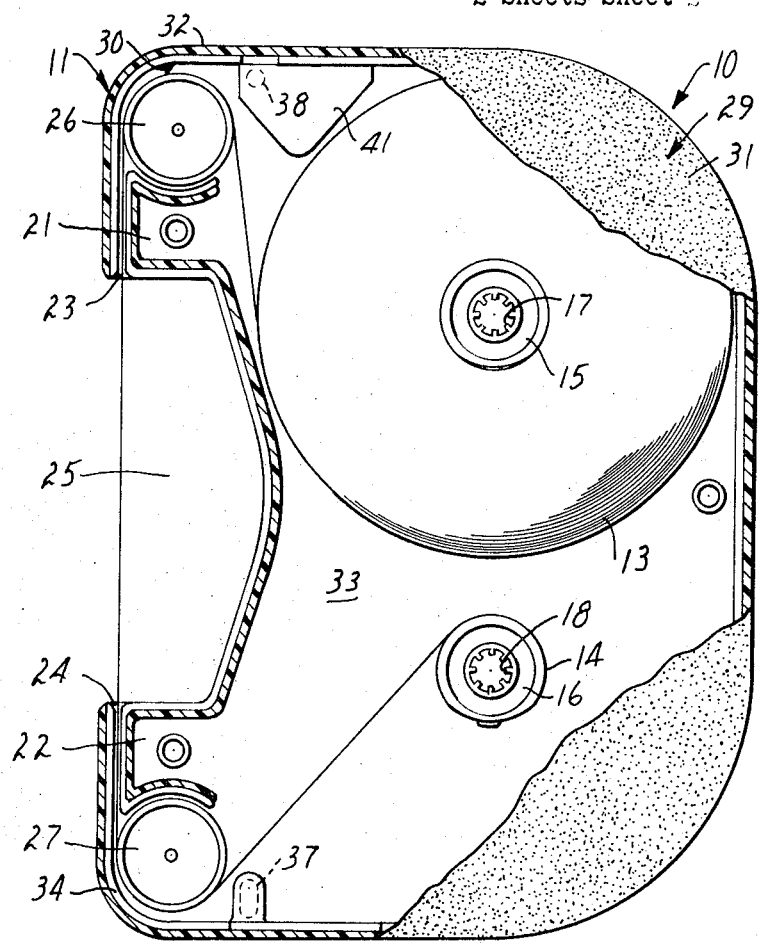
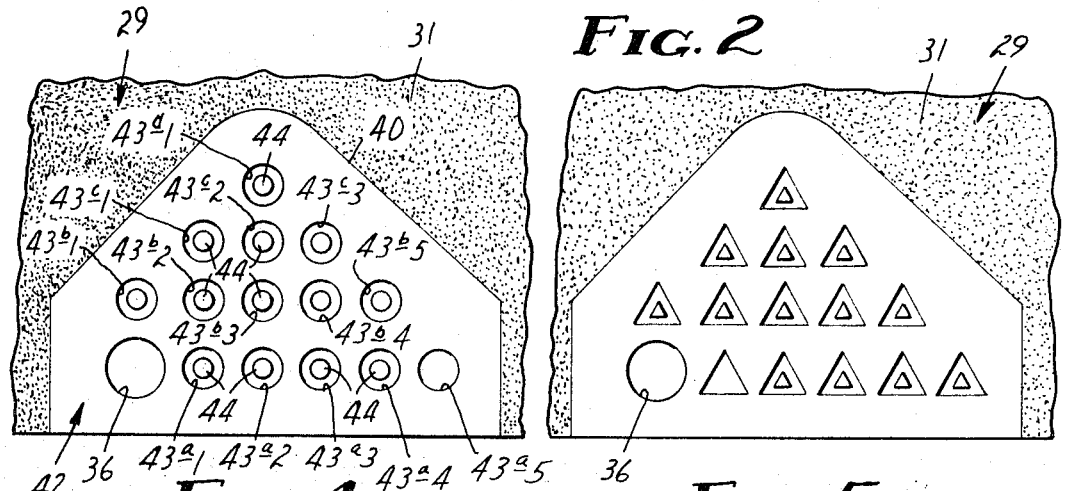
INVENTORS
PAUL A. H. PANKOW
R. ALAN DEVRIES
BY Kinney, Alexander,
Sell, Steldt & DeLaHunt
ATTORNEYS

United States Patent Office 3,666,361
Patented May 30, 1972

3,666,361
CODE STRUCTURE ON FILM CARTRIDGES
Paul A. H. Pankow, Burnsville, and Richard Alan Devries, New Brighton, Minn., assignors to Minnesota Mining and Manufacturing Company, St. Paul, Minn.
Filed Feb. 2, 1970, Ser. No. 7,745
Int. Cl. G03b 23/02
U.S. Cl. 352—78 C          13 Claims

ABSTRACT OF THE DISCLOSURE

Code structure is provided on the exterior of a film cartridge by assigning surface irregularities of different geometric shape to different values for a film variable, and forming that surface irregularity that corresponds with film stored in the cartridge on the exterior of the cartridge. In one method for forming the code structure, the cartridge is molded with a set of surface irregularities, at least one of which includes structure that makes that surface irregularity inactive in a code adapted to be sensed by a sensing member in a camera. To form a different code, a different one of the surface irregularities includes inactivating structure; the change may be made by moving a mold piece in the mold in which the cartridge is made or by removing the inactivating structure after the molding operation.

---

Film cartridges have long been provided with code structure in the form of surface irregularities in the exterior case of the cartridge that cooperate with sensing members in a camera to automatically identify the kind of film in the cartridge. But as the photographic industry expands into new areas, and it becomes increasingly desirable for a single film cartridge to be used to load a variety of different kinds of cameras, new methods for conveniently providing code structure are needed to permit encoding a wide variety of information. For example, the same film cartridge may be used to load a motion-picture camera, a microfilm camera, or a sequence camera, which each often require essentially different film, and the different kinds of film may be further subdivided by emulsion speed, color, or light sensitivity. The present invention improves over prior cartridge coding methods by providing code structure on film cartridges that is adapted to encode a wide variety of information, can be readily molded from plastic together with the cartridge, and at the same time provides easily understood and remembered visual information as to the kind of film within the cartridge.

The new coding method of this invention uses the geometric configuration of surface irregularities to provide a code structure on the exterior case of a film cartridge. More specifically, a surface irregularity is selected from a series of surface irregularities of different geometric shape and the selected irregularity is assigned to a predetermined value for a film variable. The exterior case of a film cartridge intended to contain film having the predetermined value for the film variable is then formed with the selected surface irregularity. In addition to geometric shape, the location or size of the irregularity is also sometimes used to provide a more complicated code.

The code structure is conveniently provided according to one preferred method by molding the exterior wall of the cartridge with a set of surface irregularities, such as recesses, with at least one of the surface irregularities including structure, such as a thin post in a recess, that makes the surface irregularity inactive in a code adapted to be sensed by sensing members in a camera. The one or more surface irregularities that establish the code are formed by omitting the inactivating structure from one or more surface irregularities. In such a method, cartridges to be provided with different codes may be made in the same mold, and the different codes are formed by moving one or more mold pieces to omit the inactivating structure from a different surface irregularity or irregularities, or by removing one or more inactivating structures after the cartridge has been molded.

DESCRIPTION OF THE DRAWINGS

FIG. 2 is a view like FIG. 1, but with the near sidewall partially removed to show the interior of the film cartridge;

FIG. 4 is a detail view of code structure of the cartridge shown in FIG. 1;

FIG. 5 is a detail view like that of FIG. 4, but showing a different code structure on a cartridge of the invention.

DETAILED DESCRIPTION

The method of this invention for providing code structure on a film cartridge may be used with a variety of different kinds of film cartridges, including cartridges that store rather large rolls of film for use in motion-picture cameras, microfilm cameras, or sequence cameras; cylindrical cassettes typically used in 35-millimeter cameras; and magazines recently popularized for instant-loading still cameras. To provide a concise specification, the present invention will be described in detail only with respect to the first kind of film cartridge, but in general the invention may be used with any film cartridge.

Figure 1:
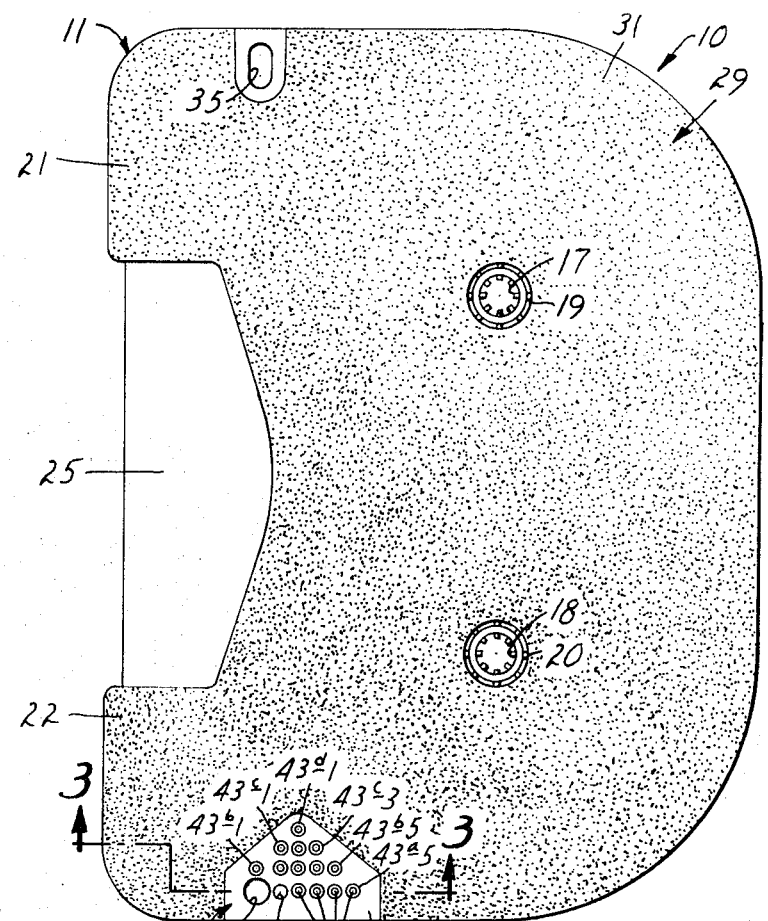
FIG. 1 is an elevation view of one side of an illustrative film cartridge of this invention.

As shown in FIGS. 1 and 2, one cartridge 10 of the type described has an exterior case 11 that includes a main body portion in which a supply roll 13 and a take-up roll 14 of film are wound on rotatable spools 15 and 16, respectively. The spools 15 and 16 have central bores 17 and 18 and the exterior case has openings 19 and 20 aligned with these bores, so that a spool-drive-pin from the camera in which the cartridge is placed may drivingly engage the spools. Two parallel separated arms 21 and 22 projecting forwardly from the main body portion each include a straight-line film passageway 23 and 24 near their forward end. The passageways 23 and 24 open on the space 25 between the arms and are lineally aligned with one another so as to define a straight-line film path through the space 25, where the film is engaged by film-advancing apparatus and exposed in a photographic operation. Idler rollers 26 and 27 are positioned in the arms 21 and 22 at the inside of the passageways and tangential to the straight-line film path. Film travels from the supply roll 13 around the idler roll 26, then along the straight-line film path through the space 25 between the arms, and then around the idler roller 27 back to the take-up roll 14. The cartridge 10 is adapted to be used with film that is initially exposed on only one-half of its width, and after transfer of film from the supply roll to the take-up roll, the cartridge is flipped over and reinserted in the camera, with the original supply spool becoming the take-up spool.

The exterior case 11 of the illustrative cartridge 10 includes two mating sections 29 and 30, which are typically molded from plastic. The case section 29, which is the top section in FIGS. 1 and 2, includes a large-area sidewall 31 and an edgewall 32 extending perpendicularly to the large-area sidewall around the circumference of the sidewall. The case section 30, which is the bottom section in FIGS. 1 and 2, similarly includes a large-area sidewall 33 and an edgewall 34 that extends perpendicularly from the large-area sidewall 33 around the circumference of the sidewall. The edgewall from one cartridge section extends nearly to the large-area sidewall of the other cartridge section when the two sections are assembled as a complete cartridge case, and this overlapping of the edgewalls forms a light-tight baffle arrangement.

The cartridge 10 is typically inserted in a camera by laying one of the large-area sidewalls 31 and 33 flat on a base plate in a cartridge-receiving compartment of the camera. The sections 29 and 30 of the case 11 are each provided with locator recesses, 35 and 36 in section 29, and 37 and 38 in section 30, and the recesses are adapted to receive locator pins extending from the base plate of the camera to align the cartridge with respect to the exposure apparatus and film-advancing apparatus as well as to align the cartridge with respect to members in the camera that sense the code structure on the cartridge.

The illustrative cartridge 10 has two code areas 40 and 41, one code area being on the exterior of each sidewall to permit the cartridge to be used with either large-area sidewall 31 or 33 adjacent the sensing member in a camera. As will be seen, the locator recesses 36 and 38 are located at the code areas 40 and 41, respectively, assuring good alignment between code structure at the code area and a sensing member in the camera. The code structure 42 at the code areas 40 and 41 include latent code structure adapted to provide a wide variety of codes. Yet despite the many different codes that can be provided using this basic code structure, the code structure 42 is made along with the rest of the cartridge by convenient plastic molding procedures. In the code structure 42 cylindrical recesses have been selected as the surface irregularity assigned to film to be stored in the cartridge. A set of cylindrical recesses $43a1$, $43a2$, $43a3$ . . . $43d1$ arranged in rows $a$, $b$, $c$, and $d$ are provided with all but one of the recesses containing a thin post 44. Absence of a post 44 from the recess $43a1$ adapts it to receive a sensing pin extending into the cartridge-receiving compartment of the camera. Thus the code at the code area 40 of the cartridge 10 is a single cylindrical recess, present at the "$a1$" position.

A code different from the code shown in FIG. 1 is provided in other cartridges by removing a post 44 from a different one of the recesses 43, either in place of, or in addition to, removing a post from the recess $43a1$. FIG. 4 is a detail view of a code area on a different cartridge 10 in which the post 44 is removed from only the $43a5$ recess. Such as code might typically indicate that the cartridge of FIG. 4 is loaded with the same general kind of film loaded in the cartridge shown in FIG. 1, but that the film in the cartridge of FIG. 4 has a film speed, for example, different from that of film in the cartridge of FIG. 1.

Figure 3:
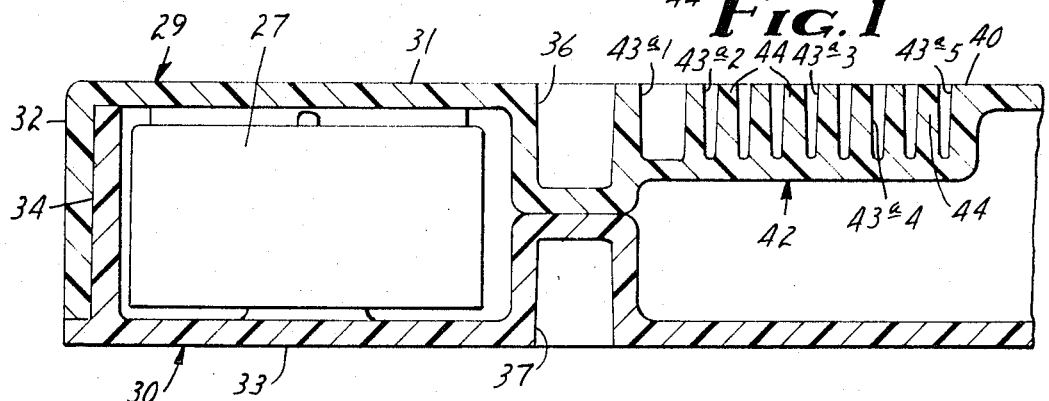
FIG. 3 is a section along the lines 3—3 in FIG. 1.
Figure 6:
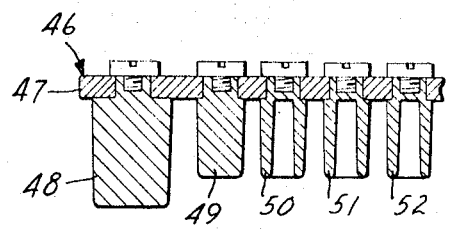
FIG. 6 is a section view of a detail of a mold used to make the cartridge of FIG. 1.

The location of posts 44 in the code structure 42 is changed most typically by changing the location of parts of the mold. FIG. 6 shows a part of a mold 46 in which part of the code structure 42 of the cartridge 10 shown in FIGS. 1 and 3 is molded. The part of the mold shown, which typically is an insert into the mold proper, includes a main plate 47 and core pins 48–52 attached to the main plate by screws. The core pin 48 forms the locator recess 36, the core pin 49 forms the code recess $43a1$, and the core pins 50, 51, and 52 form the inactive recesses $43a2$, $43a3$, and $43a4$. As will be seen, the location of active code recesses is conveniently changed simply by moving the core pins. Alternatively to forming the active code recesses at different locations by changing the mold, a code structure such as the code structure 42 is also formed by molding a code structure in which all of the recesses 43 contain a post 44, and the one or more posts that are to be omitted to form the code are removed by boring or knocking them out.

When basic changes in the film to be included in a cartridge are made, then the code on the cartridge is typically changed in a more basic way than simply changing the location of surface irregularities, namely, by using a different geometric configuration for the recesses. For example, if a change in film is made that makes the film useful in a sequence camera rather than a motion-picture camera, such as a change in size, use of nonperforated film, change from color to black-and-white, etc., then differently shaped recesses are typically used, and the shape of recesses used may have been identified in advertising and trade literature as meaning film useful in a sequence camera. FIG. 5 shows a code structure of the type previously illustrated in which triangular recesses are used as the surface irregularities. In other cartridges, square, cross-shaped, hexagonal, etc. recesses will be used. In some embodiments of the invention, instead of making a code structure in which the surface irregularities are all of the same geometric configuration, the code structure includes surface irregularities of different geometric configurations.

The sensing means within a camera adapted to sense a code provided by the illustrated code structure 42 may be a sensing pin that is fixed in a single position, in which case mating of the pin within a code recess in the cartridge simply permits the cartridge to be inserted into the camera. Such a use of a code structure of this invention provides a simple way of automatically assuring that only cartridges loaded with appropriate film will be inserted into a camera. In other embodiments of the invention, the sensing pin is movable along its axis, and if the recess in the code structure that registers with the sensing pin is filled with a post, the pin is depressed to operate exposure-control means in the camera. For example, movement of the pin into a retracted position may block exposure and advancement of film by interrupting supply of electric power to a drive motor, disengaging a drive gear, or the like; or may move a light filter into or out of the photographic light path; or may actuate a warning light on the camera; or may change the speed of film-advancement by adjusting a rheostat or connecting a different electric motor winding to the electric power supply. In still other embodiments of the invention useful with the code structure illustrated in the drawings, an axially movable sensing pin is biased toward an extended position from a retracted position, and movement of the sensing pin into the extended position by mating of the sensing pin within a code recess operates exposure-control means within the camera.

Also, cameras used with film cartridges having a code structure such as the code structure 42 may include a set of sensing members having sensing surfaces adapted to mate with the geometric configuration of the recesses of the code structure and movable from retracted to extended positions. When the code includes only a single active recess, all but one of the sensing members remain in a retracted position when a cartridge is inserted into the camera, and the one sensing member that mates with the active recess travels to its extended position and operates exposure-control means of the camera. In other cameras adapted for use with cartridges of the invention, a single sensing member is manually movable between the various positions in which it registers with the possible locations for a surface irregularity in the cartridge.

Code structure of the invention may be more simple than the code structure 42 shown in the drawings. For example, the code structure may consist of a single recess molded in the exterior of the cartridge case, with the geometric configuration of the recess providing the code for the cartridge. And, while the recesses of the code structure shown in FIG. 1 are rather small in diameter, other surface irregularities providing code structure on cartridges of the invention may be quite large in diameter, thus lessening the need for close tolerances in manufacturing cooperating parts. In other cartridges, locator recesses such as the recesses 35–38 function as code structure, with the geometric configuration of the locator recess or recesses being changed when the cartridge is to be used with a different kind of film. Further, while the simplest method for forming code structure in a film cartridge of the invention is to form recesses in the exterior walls of the cartridge, code structure of the invention also takes the form of raised portions having a geometric configuration assigned to a predetermined value for a film variable.

Code structure of the present invention sometimes is coded to provide information by assigning different depths of a code recess to different values for a film variable. Such cartridges of the invention are useful in cameras provided with a sensing pin that is movable from a retracted position through a first extended position to a second extended position, and the exposure-control means within the camera is adjusted to three different states of operation depending on which of the positions the sensing pin is in.

What is claimed is:

1. A film cartridge comprising (1) an exterior case for enclosing film and (2) code structure formed on the exterior surface of the case, said code structure comprising a set of recesses in the case that, except for at least one recess, are occupied by a thin post that prevents entrance of a sensing member of a camera into the recess, said recess not occupied by a post being adapted to receive said sensing member.

2. A cartridge of claim 1 in which all of the recesses are of the same geometric configuration.

3. A cartridge of claim 1 in which at least one of the recesses has a geometric configuration different from the geometric configuration of another of the recesses.

4. A film cartridge comprising (1) two parallel large-area sidewalls and edgewalls joining the sidewalls to define (a) a main body portion for storing separate supply and take-up rolls of film on parallel spaced axes and (b) two parallel separated arms that project forwardly from the main body portion, each arm having a straight-line film passageway that opens on the space between the arms and is lineally aligned with the other passageway; and (2) a code structure formed in at least one large-area sidewall comprising a set of recesses in the sidewall that, except for at least one recess, are occupied by a thin post that prevents entrance of a sensing member of a camera into the recess, said recess not occupied by a post being adapted to receive said sensing member.

5. A cartridge of claim 4 which is insertable into a camera in either of two positions, with either large-area sidewall against a base plate in the camera, the cartridge having a code structure as described in claim 14 in each large-area sidewall at a position such that either code structure is adapted to cooperate with the same sensing member in the camera depending on which sidewall is laid against the base plate.

6. A method for providing code structure in a film cartridge comprising (a) constructing a mold in which an exterior case of the cartridge may be molded, the mold including a plurality of mold parts for molding a code area in the exterior surface of the case, each code-area mold part forming the surface of the case at one discrete position within the code area and forming either an active surface irregularity sensible by a sensing member in a camera or leaving the position inactive, the code-area mold parts being replaceable so as to make any position either active or inactive, whereby a code area is formed consisting of both active and inactive positions; and (b) filling the mold with a molding material to mold the exterior case of the cartridge.

7. A method of claim 6 in which each of the code-area mold parts forms the same surface irregularity but some of the code-area mold parts form the surface irregularity with structure that makes the irregularity inactive with respect to the sensing member.

8. A method of claim 6 in which at least one of the mold parts forms a recess in the exterior case that may be sensed by the sensing member in the camera, and at least one of the mold parts forms a recess in the exterior case that is occupield by a thin post that prevents entrance of the sensing member into the recess.

9. A plurality of film cartridges of different categories for storing different categories of film, the cartridge of each category comprising an exterior case for enclosing a roll of film and at least one surface irregularity on the exterior of the case, said surface irregularity being centered at the same position in each of the categories but being different in geometric configuration from category to category, and each different surface irregularity being assigned to a different category of film to be stored in the cartridges and being adapted to cooperate with sensing means within a camera to automatically identify the kind of film stored within the cartridge.

10. Film cartridges of claim 9 in which there are at least two surface irregularities on each cartridge, the surface irregularities are recesses, and at least one of the recesses is occupied by a thin post that prevents entrance of a sensing member of a camera into the recess, and at least one of the recesses is not occupied by a post and is adapted to receive said sensing member.

11. Film cartridges of claim 9 which comprise two parallel large-area sidewalls and edgewalls joining the sidewalls to define (a) a main body portion for storing separate supply and take-up rolls of film on parallel spaced axes and (b) two parallel separated arms that project forwardly from the main body portion, each arm having a straight-line film passageway that opens on the space between the arms and is lineally aligned with the other passageway.

12. Film cartridges of claim 11 in which the surface irregularities are recesses formed on at least one large-area sidewall.

13. A film cartridge comprising two parallel large-area sidewalls and edgewalls joining the sidewalls to define (a) a main body portion for storing separate supply and take-up rolls of film on parallel spaced axes and (b) two parallel separated arms that project forwardly from the main body portion, each arm having a straight-line film passageway that opens on the space between the arms and is lineally aligned with the other passageway; the cartridge being insertable into a camera in either of two positions, with either large-area sidewall against a base plate in the camera, and at least one code structure formed in each large-area sidewall at positions that are symmetrical about an axis of the cartridge that is parallel to the forwardly projecting arms and centrally located between them, whereby the code structures are each adapted to cooperate with the same sensing member in the camera depending on which sidewall is laid against the base plate.

(References on following page)

References Cited

UNITED STATES PATENTS

| | | | |
|---|---|---|---|
| 3,208,363 | 9/1965 | Easterly et al. | 352—78 UX |
| 3,312,158 | 4/1967 | MacMillin et al. | 352—78 X |
| 3,444,795 | 5/1969 | Nerwin | 95—31 CA |
| 3,276,340 | 10/1966 | Nerwin | 95—31 FS |
| 3,485,157 | 12/1969 | Nerwin | 352—78 X |
| 3,490,348 | 1/1970 | Ariyasu et al. | 352—78 X |
| 3,492,927 | 2/1970 | Thiele et al. | 352—78 X |

FOREIGN PATENTS

| | | | |
|---|---|---|---|
| 973,171 | 10/1964 | Great Britain | 352—78 |
| 1,078,268 | 8/1967 | Great Britain | 352—78 |
| 1,472,667 | 1/1969 | Germany | 352—78 |

LOUIS R. PRINCE, Primary Examiner

J. W. ROSKOS, Assistant Examiner

U.S. Cl. X.R.

95—31 CA

UNITED STATES PATENT OFFICE
CERTIFICATE OF CORRECTION

Patent No. 3,666,361                Dated May 30, 1972

Inventor(s) Paul A. H. Pankow and Richard A. DeVries

It is certified that error appears in the above-identified patent and that said Letters Patent are hereby corrected as shown below:

In the claims:

In column 5, line 68, "14" should be --4--.

In column 6, line 24, "occupield" should be --occupied--.

In the specification:

In column 3, line 44, "include" should be --includes--.

In column 3, line 66, "as" should be --a--.

Signed and sealed this 21st day of November 1972.

(SEAL)
Attest:

EDWARD M. FLETCHER, JR.               ROBERT GOTTSCHALK
Attesting Officer                    Commissioner of Patents